US008649494B2

(12) United States Patent  (10) Patent No.: US 8,649,494 B2
Basson et al.  (45) Date of Patent: Feb. 11, 2014

(54) PARTICIPANT ALERTS DURING MULTI-PERSON TELECONFERENCES

(75) Inventors: Sara H. Basson, White Plains, NY (US); Dimitri Kavesky, Ossining, NY (US); Edward E. Kelley, Wappingers Falls, NY (US); Peter G. Fairweather, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1339 days.

(21) Appl. No.: 12/185,871

(22) Filed: Aug. 5, 2008

(65) Prior Publication Data

US 2010/0034366 A1   Feb. 11, 2010

(51) Int. Cl.
*H04M 3/42* (2006.01)
*H04L 12/16* (2006.01)

(52) U.S. Cl.
USPC ...................................... 379/204.01; 370/260

(58) Field of Classification Search
USPC ............. 379/202.01, 203.01, 204.01, 205.01, 379/206.01; 370/352, 353, 354, 355, 356, 370/357; 455/416
See application file for complete search history.

(56) References Cited

U.S. PATENT DOCUMENTS

| | | | |
|---|---|---|---|
| 6,850,609 B1 * | 2/2005 | Schrage | 379/202.01 |
| 7,412,392 B1 * | 8/2008 | Satapathy | 704/270.1 |
| 2004/0030753 A1 | 2/2004 | Horvitz | |
| 2004/0047461 A1 * | 3/2004 | Weisman et al. | 379/202.01 |
| 2004/0136515 A1 * | 7/2004 | Litwin, Jr. | 379/202.01 |
| 2006/0193459 A1 | 8/2006 | Cadiz et al. | |
| 2007/0036320 A1 | 2/2007 | Mandalia et al. | |
| 2007/0280464 A1 * | 12/2007 | Hughes et al. | 379/205.01 |
| 2008/0037751 A1 * | 2/2008 | Aldrey et al. | 379/202.01 |
| 2009/0028316 A1 * | 1/2009 | Jaiswal et al. | 379/202.01 |
| 2009/0086949 A1 * | 4/2009 | Caspi et al. | 379/202.01 |
| 2009/0125295 A1 * | 5/2009 | Drewes | 704/3 |
| 2009/0262914 A1 * | 10/2009 | Khouri et al. | 379/202.01 |
| 2009/0296908 A1 * | 12/2009 | Lee et al. | 379/202.01 |
| 2009/0305695 A1 * | 12/2009 | Bear et al. | 455/426.1 |
| 2009/0316872 A1 * | 12/2009 | Wolf et al. | 379/202.01 |

* cited by examiner

*Primary Examiner* — Mohammad Islam
*Assistant Examiner* — Kharye Pope
(74) *Attorney, Agent, or Firm* — Cantor Colburn LLP

(57) ABSTRACT

A method for alerting teleconference participants includes: activating a mute function in response to a participant command; tracking a teleconference's conversation audio; determining the level of alertness of a participant; determining whether the participant's name is detected in the teleconference audio; wherein in the event the participant's name is detected: determining whether the context in which the participant was addressed requires the participant to respond; wherein in the event the participant is required to respond: alerting the participant that the participant has been summoned and is required to make a response; providing a conversation summarization to the participant; and deactivating the participant's mute function.

20 Claims, 6 Drawing Sheets

PARTICIPANT ALERTS DURING MULTI-PERSON TELECONFERENCES

BACKGROUND

This invention relates generally to telecommunications, and more particularly to a system, article, and method for providing participant alerts during multi-person teleconferences.

A teleconference is the live exchange and mass articulation of information among persons and machines remote from one another but linked by a telecommunications system or network. A teleconference differs from a videophone in that a teleconference serves groups rather than individuals. The telecommunications system may support the teleconference by providing one or more of the following audio, video, and/or data services by one or more means, such as telephone, telegraph, teletype, radio, television, and data networks, such as the Internet. Teleconferences are an emerging way to communicate and conduct business without the cost of travel. The host of a teleconference will schedule a specific time and date in advance to communicate with other participants. The number of participants in the teleconference may range from two to an arbitrarily large number.

SUMMARY

Embodiments of the present invention include a method, article, and system for alerting teleconference participants, the method includes: activating a mute function in response to a participant command; tracking a teleconference's conversation audio; determining the level of alertness of a participant; determining whether the participant's name is detected in the teleconference audio; wherein in the event the participant's name is detected: determining whether the context in which the participant was addressed requires the participant to respond; wherein in the event the participant is required to respond: alerting the participant that the participant has been summoned and is required to make a response; providing a conversation summarization to the participant; and deactivating the participant's mute function.

An article comprising one or more computer-readable storage media containing instructions that when executed by a computer enables a method for alerting teleconference participants, the method includes: activating a mute function in response to a participant command; tracking a teleconference's conversation audio; determining the level of alertness of a participant; determining whether the participant's name is detected in the teleconference audio; wherein in the event the participant's name is detected: determining whether the context in which the participant was addressed requires the participant to respond; wherein in the event the participant is required to respond: alerting the participant that the participant has been summoned and is required to make a response; providing a conversation summarization to the participant; and deactivating the participant's mute function.

A system for alerting teleconference participants, the system includes: one or more communication devices in communication through a network; wherein the one or more communication devices are configured to do the following: activate a mute function in response to a participant command; track a teleconference's conversation audio; determine whether the participant's name is detected in the teleconference audio; wherein in the event the participant's name is detected: determines the context in which the participant was addressed requires the participant to respond; wherein in the event the participant is required to respond: alerts the participant that they have been summoned and are required to make a response; determines the level of alertness of the participant; provides a conversation summarization to the participant; and deactivates the participant's mute function.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
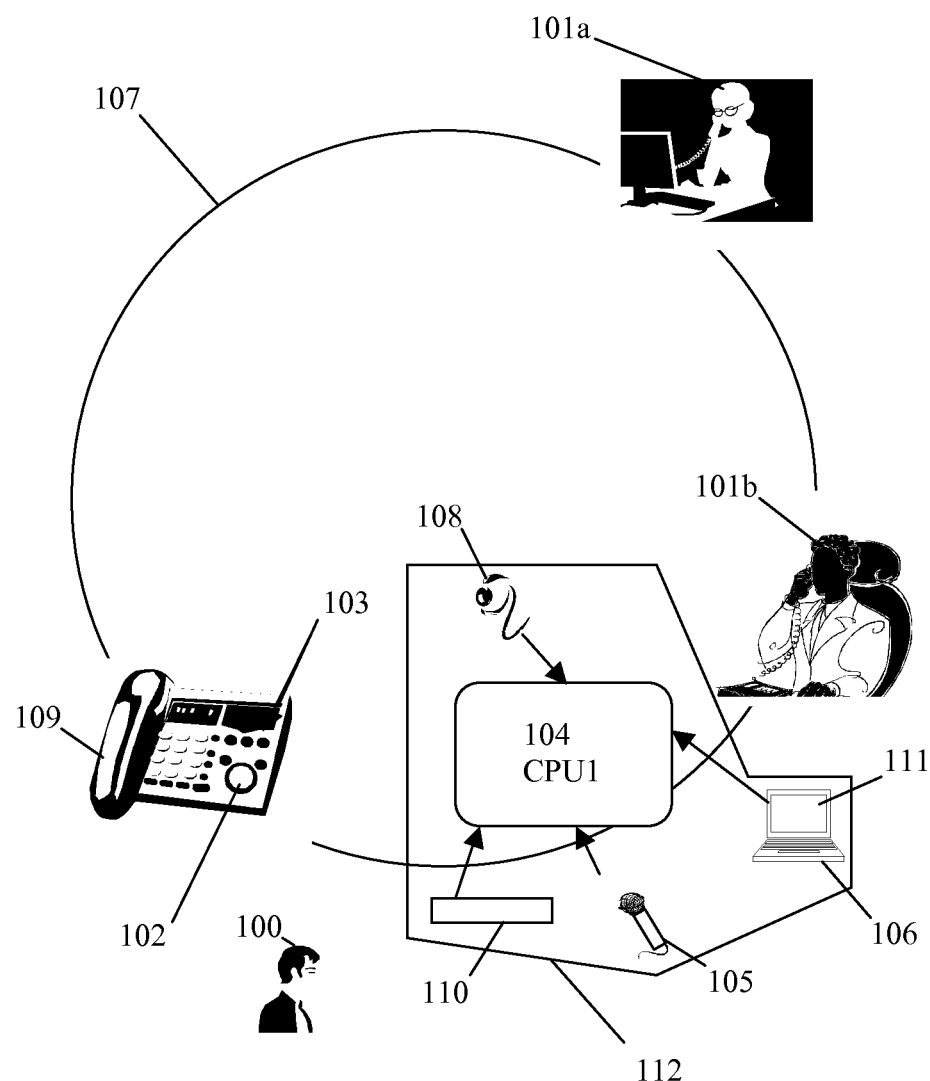
FIG. 1 is a block diagram of a teleconference network according to embodiments of the invention.

The detailed description explains the preferred embodiments of the invention, together with advantages and features, by way of example with reference to the drawings.

DETAILED DESCRIPTION

Teleconferencing has become a prevalent method for business meetings, enabling participants from multiple work sites to conduct business. However, participation via telephone changes the dynamic of a meeting, since participants are generally not physically observable. As a result, it has become common practice for participants to put the conference call on "mute" when it is not a participant's turn to speak. The muting function allows participants at a single location to hold "side conversations" during the actual meeting, without being heard by other participants. Participants may also "multi-task" and be engaged in multiple meetings simultaneously, with the goal of engaging with more focus only at points in the teleconference that are most relevant to a particular participant.

However, as a result of the muting feature, participants often remain on "mute" inadvertently when it is in fact their time to participate. The participant still on mute when they begin to speak, unaware that the other participants in the teleconference are not hearing them. As a result, several seconds of "dead time" ensue, until others participants on the call comment about the "silence," which alerts the speaker to disengage the "mute" button. In a second scenario, a participant who is involved in other non-conference call activities is "summoned" by the other participants on the call. The participant is then required to respond, but is often unsure what the question or context is since they were distracted and not giving the call their full attention, which results in a double distraction and delay on the call. First, the summoned participant begins responding while the mute button is on, and when the summoned participant realizes they are not being heard, the summoned participant takes the call off mute. Secondly, the summoned participant may need to ask other participants on the call to repeat the question or provide some background in order to respond appropriately. The result is wasted time for all participants, and embarrassment for the summoned participant that was not paying full attention to the call. The aforementioned scenario may be avoided in face-to-face meetings, where there are fewer opportunities for participants to be fully distracted with other activities. However the drawbacks to mandate face-to-face meetings are the additional time and expense involved that are mitigated with a teleconference.

Furthermore, current methods of user interaction in a teleconference environment that limit the occurrence of miscommunication due to "mute" button feature are limited. Visual cues are used to indicate if a user is on hold during a conference call. The user who is on hold is silenced while certain parties communicate only between each other. This function is controlled by a teleconference mediator and not by individual members. Embodiments of the present invention address the issues associated with user-controlled mute functions.

Embodiments of the invention provide a method, article, and system for addressing participant miscommunication in teleconferences due to the activation and deactivation of muting features during a teleconference. Embodiments of the invention detect instances where a particular participant (referred to here as "X") is being "summoned" and is required to engage more fully in a conference call. In many instances, a different participant on the call will call out X's name, which is the cue that X needs to participate and speak into the telephone. Embodiments of the invention employ speech recognition technology to identify when a participants name is mentioned, and the context in which the user's name is said, in order to determine if the mentioned participant is now required to respond. For example, the statements, "What do you think, X?" versus, "Last week I discussed this with X", are different in that only the first statement requires participant X's response. Embodiments of the invention determine not only the location of a participant's name in a sentence, but if the sentence is a question or a statement that requires the participant's response.

In the event a mention of a participant X's name requires a response by the participant as determined by embodiments of the invention, the mute button on X's telephone may be automatically disengaged, thereby opening up the communication channel for X to speak and be heard. Embodiments of the invention may alert participant X with a visual, audio or tactile stimuli that the mute function has been disengaged. The tactile stimulus may be vibratory in nature. In addition, participant X often has not fully processed the question they are being asked, or the context that preceded the question prior to disengaging the mute function. To address this shortcoming, embodiments of the invention may provide participant X with a "whispered" version of the preceding question that is only audible to participant X, and is also optionally presented to participant X in accelerated form employing time-compressed speech. Embodiments of the invention may also present participant X with a text version of the preceding portion of the conversation, which they may quickly scan to familiarize themselves with the present state of the teleconference. Participant X may also be presented with a summarized portion of the preceding conversation, providing them with the salient points that have been raised in the conversation. Based on a determined level of alertness of participant X at the time that they are prompted to respond, embodiments of the invention may provide a varying amount of summarization of the preceding conversation. For example, if participant X is asleep when prompted, a detailed summary is provided by embodiments of the invention. In the event the prompted participant is vaguely attentive to the conference and performing other tasks, key words from the last sentence may be presented.

With embodiments of the invention, in the event a teleconference participant activates the muting function with the intention of not being disturbed, the participant's environment is monitored, and the participant has the option of preventing automatic deactivation of the mute button. For example, participant X is in a teleconference, and participant X's manager enters the room and wishes to speak with participant X. Participant X activates the mute function and does not intend to be included back in the conference until their manager leaves their presence, regardless of whether someone from the teleconference addresses participant X.

FIG. 1 is a block diagram of a teleconference network 107 according to embodiments of the invention. Within the exemplary teleconference network 107, a participant 100 is talking via a communication device such as a telephone 109 configured with a speakerphone 102 to participants' 101a and 101b. The teleconference network 107 is also contains a user station 112 that is configured with a computer 106, a microphone 105, a central processing unit (CPU) 104, a camera 108, and an audio output speaker 110. The microphone 105 picks up what participant 101a or 101b says, inputting the speech into the CPU for processing and transmissions to the stations used by the other participants. The CPU 104 processes information in order to automatically turn off the mute function when a participant (100, 101a, 101b) talks into their phone 109, informs the audio output speaker 110 to whisper to a participant what they missed of the conference prior to being summoned, and informs the microphone 105 to take in what the participants are saying through the computer and pass it to the other user stations 112. The camera 108 signals the CPU 104 to turn off the mute button 103, in the event a person's body moves in certain predefined manners relative to their phone 109. For example, in the event another participant on the call (101a or 101b) calls out participant 100's name, the name calling acts as a cue that participant 100 is now required to actively participate in the teleconference and speak into the telephone 109. In the present example, in the event participant 100 has their named called out, the mute button on user 100's telephone can be automatically disengaged, thereby opening up the communication channel for participant 100 to speak and be heard by participants (101a and 101b). The computer 106 is configured with a display 111 for a graphical user interface (GUI). The GUI provides menu options for participant settings, text version summarizations of a teleconference conversation, and visual alerts.

Figure 2:
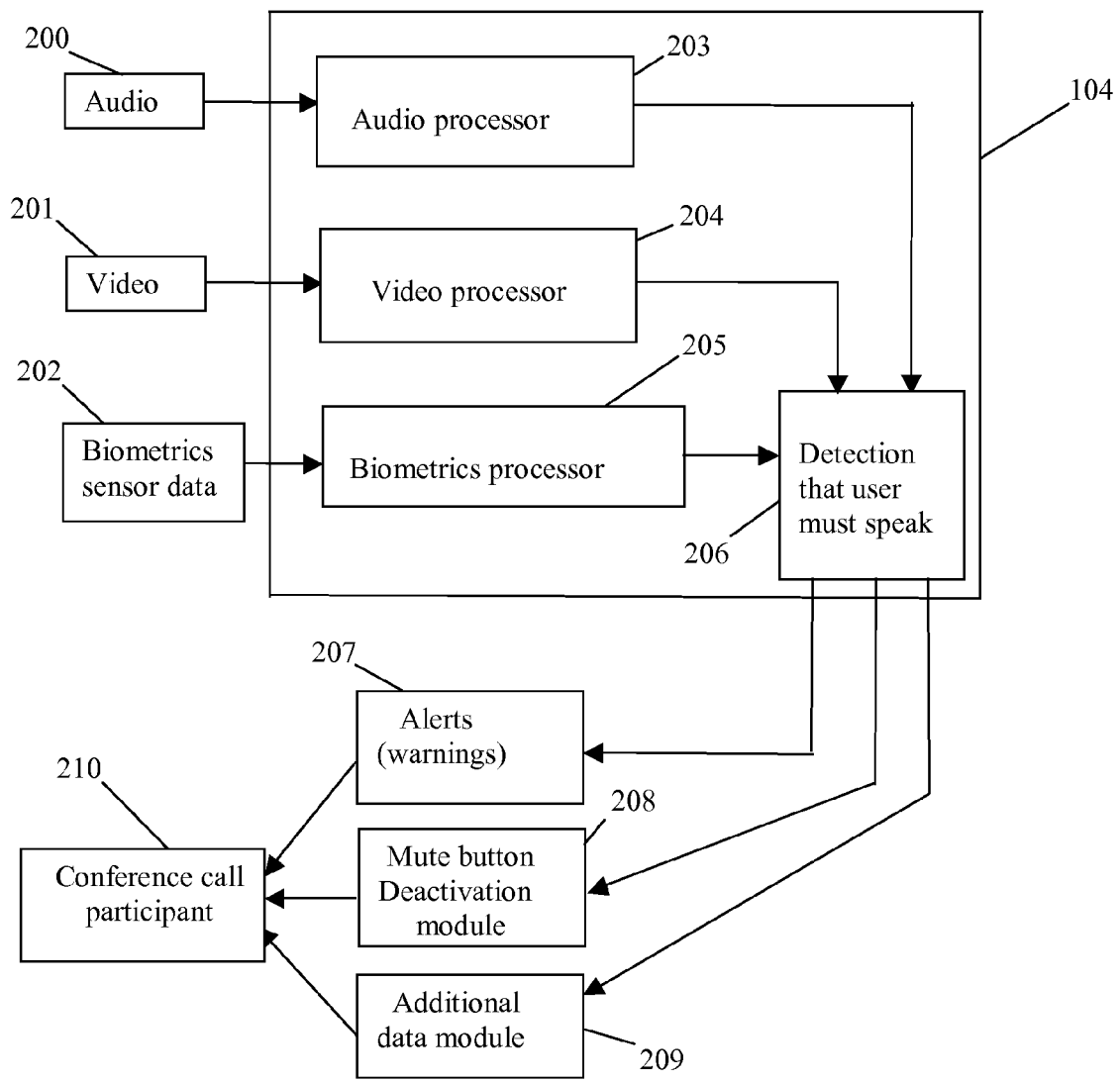
FIG. 2 is a functional block diagram of a central processing unit (CPU) utilized in a teleconference network according to embodiments of the invention.

FIG. 2 is a functional block diagram of the central processing unit (CPU) 104 of FIG. 1 that is utilized in the teleconference network 107 according to embodiments of the invention. The CPU 104 receives the following signals for further processing: an audio signal 200 for input into an audio processor 203; a video signal 201 for input into a video processor 204; and biometrics sensors data 202 that is transferred to a biometrics processor 205. The processors 203, 204 and 205 within the CPU 104 send their processed signals to a detection block 206. The detection block 206 sends alerts or warnings

207 to a participant 210 that they need to pay attention to what is happening in the conference call. For example, the participant 210 has been asked to answer a question posed by other participants in the conference call. A mute button deactivation module 208 controls mute button deactivation in the event a participant 210 is summoned to respond, or if the participant 210 begins to speak on their own accord. An additional data module 209 is configured to provide additional data to the participant 210 that they may have missed while they were distracted from the conference call. For example, the participant 210 may have missed a question, or did not hear what was discussed shortly before they were asked to respond, and the additional data module 209 provides the participant with the missing question.

Figure 3:
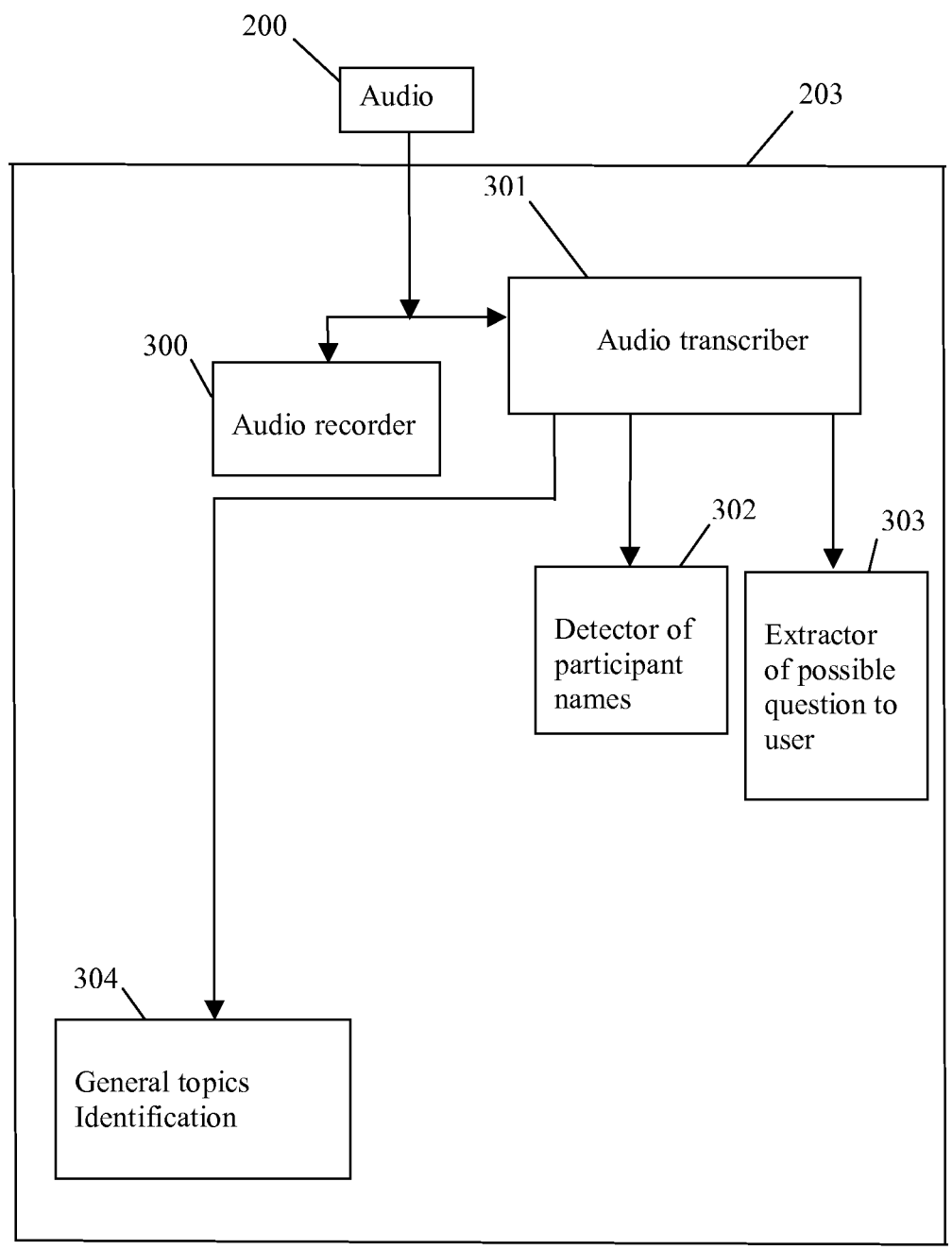
FIG. 3 is a functional block diagram of the audio processor within the CPU of FIG. 2 according to embodiments of the invention.

FIG. 3 is a functional block diagram of the audio processor 203 of FIG. 2 within the CPU 104 according to embodiments of the invention. The inputted audio signal 200 to the CPU 104 is supplied to the audio processor 203. Within the audio processor 203, the audio signal 200 from the conference call is recorded and stored in an audio recording section 300 for retrieval as required. In addition, the audio signal 200 is routed to an audio transcriber 301 that can be an automatic speech recognition system or manual transcriber. The output of the audio transcriber 301 is supplied to the following modules: a detector of participant names module 302, extractor of possible question to a participant module 303, and a general topics identification module 304. The aforementioned modules (302, 303, 304) supply their outputs to the detection block 206 of FIG. 2. As described previously, the detection block 206 sends alerts or warnings 207 to a participant 210 that they need to pay attention to what is happening in the conference call.

Figure 4:
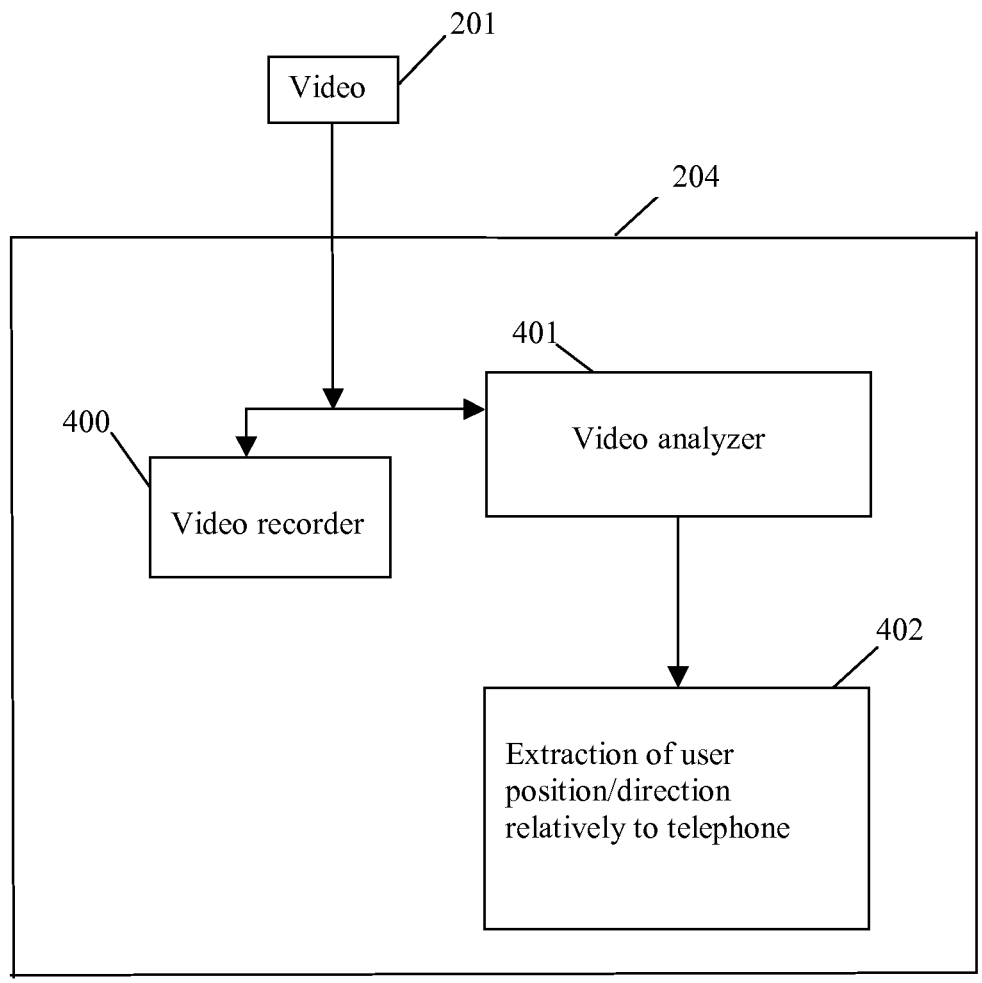
FIG. 4 is a functional block diagram of the video processor within the CPU of FIG. 2 according to embodiments of the invention.

FIG. 4 is a functional block diagram of the video processor 204 of FIG. 2 within the CPU 104 according to embodiments of the invention. The inputted video signal 201 to the CPU 104 is supplied to the video processor 204. Within the video processor 204, the video signal 201 from the conference call as supplied by camera 108 of FIG. 1 is recorded and stored in a video recording section 400 for retrieval as required. In addition, the video signal 201 is routed to a video analyzer 401. The video analyzer 401 provides a general analysis of video data 402 that is utilized to determine a participant's position and direction relative to their conference call telephone. The general analysis of the video 402 is subsequently supplied to the detection block 206, and is used to define if the participant intends to speak over their telephone.

Figure 5:
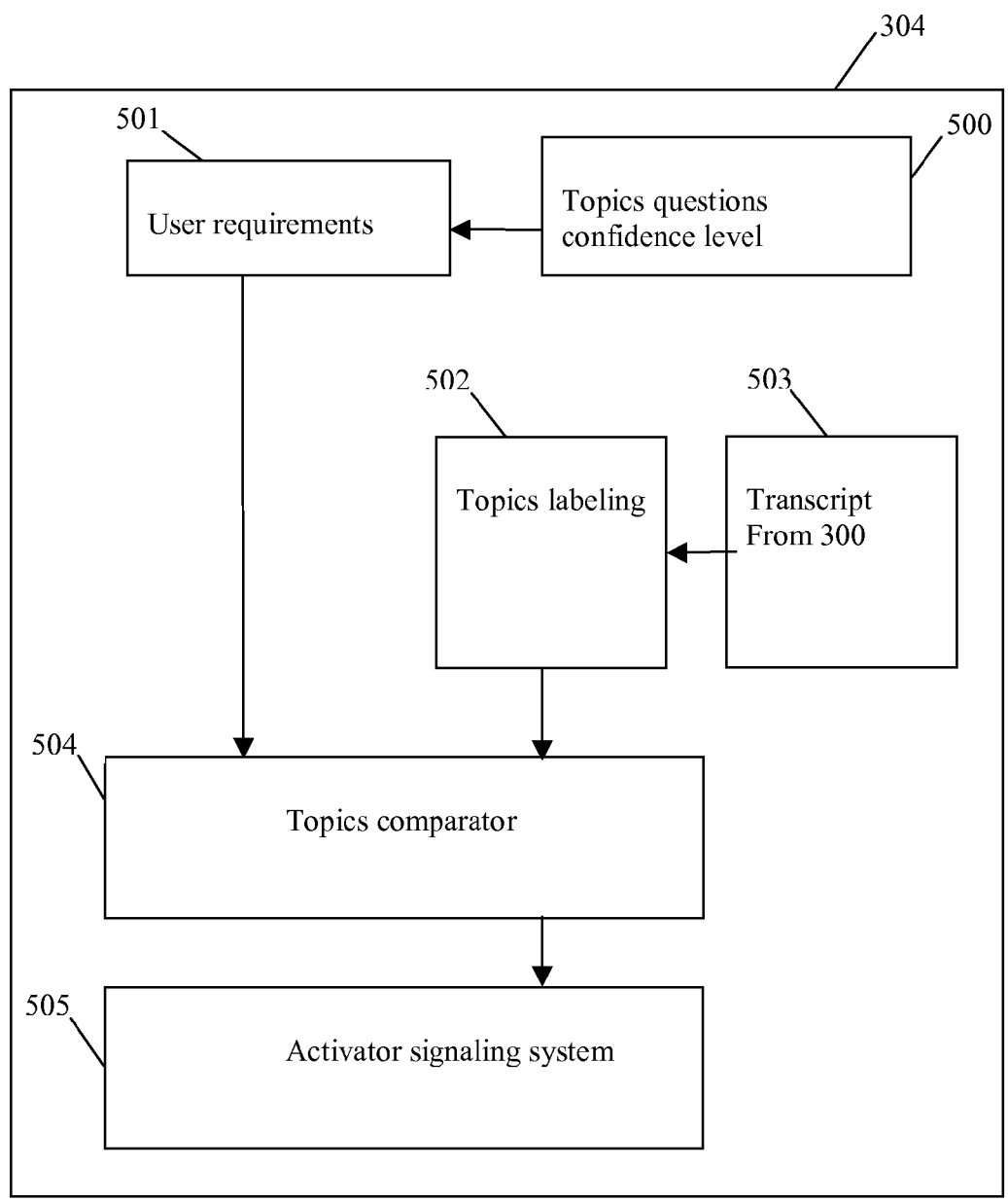
FIG. 5 is a functional block diagram of the general topic identification block within the audio processor of FIG. 3 according to embodiments of the invention.

FIG. 5 is a functional block diagram of the general topic identification block 304 within the audio processor 203 of FIG. 3 according to embodiments of the invention. The topic identification block 304 conducts a process in which audio is interpreted to identify the name of a participant in processed speech, whether or not the participant is being directly addressed (in contrast to simply being mentioned), and whether or not the participant is expected to respond The topic identification block 304 identifies where the name of a participant is placed in a sentence, therefore indicating whether or not the participant is being addressed and is being summoned to reply. For example, in the event a participant's name is mentioned at the beginning or end of a phrase, the name mention may be interpreted as a command that requires a response from the user. For example, "Julian, what do you think?" or "What do you think, Julian". Name placement within a phrase as identified by the topics comparator 504 will identify if a user is being addressed or spoken about.

Continuing with FIG. 5, a transcript 503 is generated by applying speech recognition to users' spoken contributions. A topics labeling semantic interpreter 502 parses the transcript elements and labels both the syntactic and semantic roles taken on by tokens making up the transcript. The labels produced in 502 are compared in the topics comparator 504 against the user requirements 501 that provides textual representations of the participants' domain of discourse. These domain representations not only contain the user requirements 501 corresponding to "what the user might say," but also the topics questions 500 that represent the kinds of things a user might be asked that require an overt response. All of these forms of information contribute to the creation of an elaborated context that may be used to determine the location of a participant's name, the role that name plays within a participant's utterance and the speaker's expectations whether or not the participant is required to respond. The output of the topics comparator 504 provides data to the activator signaling system 505 that sends control information such as the replay of the question asked of a participant or the change of "mute status" for a given user.

Topic identification proceeds by comparison of the user requirements, 501, (as inputted by the topic questions confidence level, 500) and the topics labeled, 502, from the audio transcript, 503 obtained from the recorded audio 300. Topics are compared for continuity 504, and processed by the activator signaling system 505, which begins the process of notifying the user that it is their turn to participate.

Figure 6:
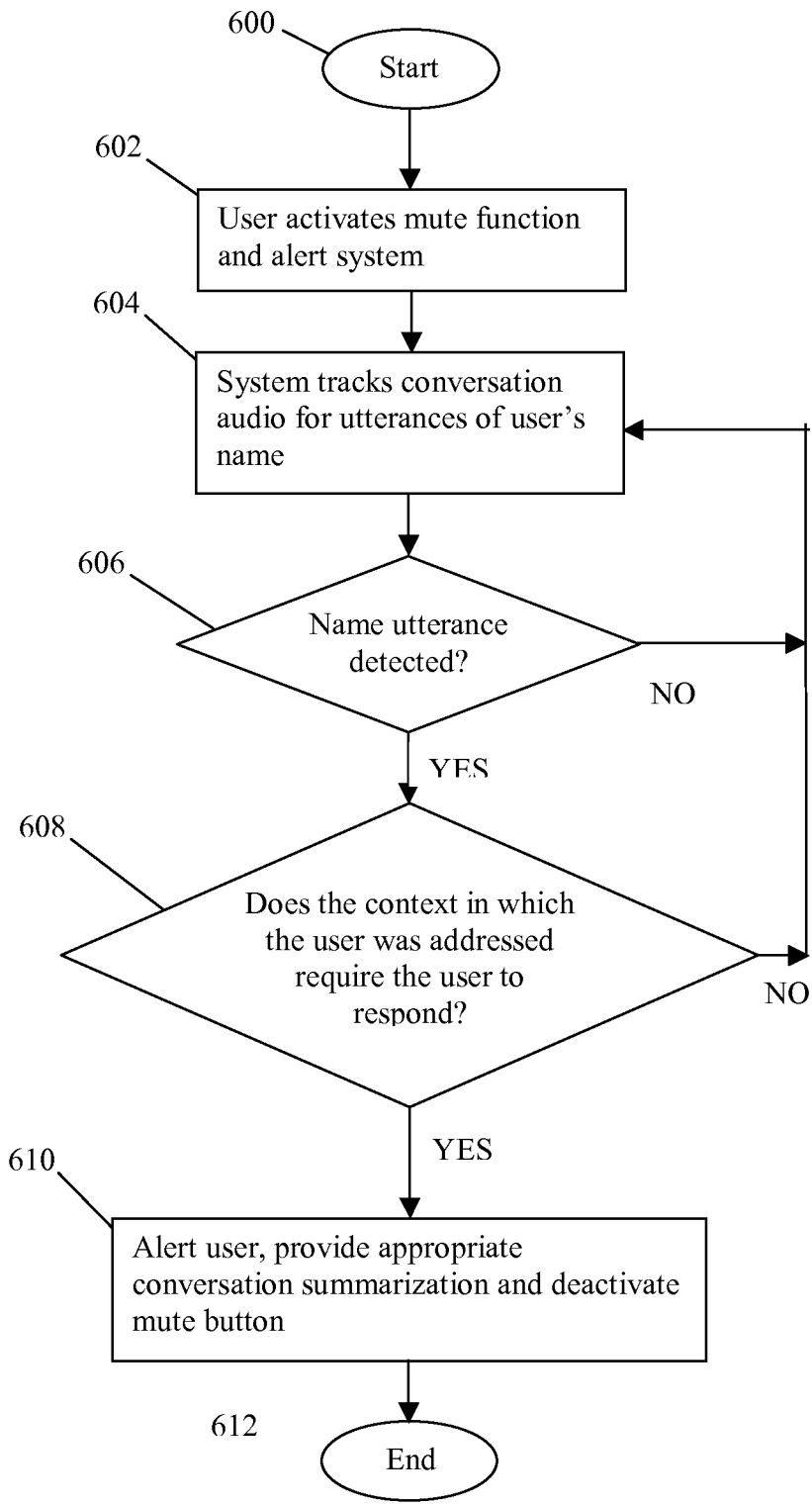
FIG. 6 is a detailed process flowchart for a participant alert function during a teleconference according to embodiments of the invention.

FIG. 6 is a detailed process flowchart for a participant alert function during a teleconference according to embodiments of the invention. The process starts (block 600) with a participant (user) activating the mute function and alert system (block 602). Subsequently, the system tracks conversation audio from the teleconference for utterances of the participant's name (block 604). In the event a name utterance is detected in the conversation (decision block 606 is Yes), a determination is made as to whether the context in which the participant was addressed requires the participant to respond. In the event a determination is made that the participant is required to respond (decision block 608 is Yes), the participant is alerted, a conversation summarization is provided to the participant, and the muting function is deactivated on the participant's phone to allow for the participant's response (block 610). In the event a name utterance is not detected (decision block 606 is No), or is detected but does not require the user's response (decision block 608 is No), the system continues to scan for name utterances (block 604).

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A method for alerting a participant in a teleconference, wherein the method comprises:
    activating a mute function, by a CPU, in response to a command received from the participant;
    tracking an audio of the teleconference;
    determining a level of alertness of the participant to the teleconference based upon a position of the participant relative to a telephone;
    determining whether the participant's name is detected in the audio;
    wherein in the event the participant's name is detected:
        determining whether a context in which the participant was addressed requires the participant to respond;
    wherein in the event the participant is required to respond:
        alerting the participant that the participant has been summoned and is required to make a response;
        providing a conversation summarization to the participant;
        providing a conversation summarization to the participant, wherein an amount of the conversation summarization is based on the level of alertness of the participant at the time of the alerting; and
        deactivating the mute function.

2. The method of claim 1, further comprising using a speech recognition application in the determining of whether the participant's name is detected in the teleconference audio.

3. The method of claim 1, wherein the alerting comprises at least one of: visual, audio, and tactile stimuli.

4. The method of claim 1, further comprising audibly providing the conversation summarization to the participant.

5. The method of claim 1, further comprising providing a text version of the conversation summarization to the participant.

6. The method of claim 1, further comprising enabling the participant to prevent the deactivation of the mute function.

7. One or more non-transitory computer-readable storage media containing instructions that when executed by a computer enables a method for alerting a participant in a teleconference; wherein the method further comprises:
    activating a mute function, by a CPU, in response to a command received from the participant;
    tracking an audio of the teleconference;
    determining a level of alertness of the participant to the teleconference based upon a position of the participant relative to a telephone;
    determining whether the participant's name is detected in the audio;
    wherein in the event the participant's name is detected:
        determining whether a context in which the participant was addressed requires the participant to respond;
    wherein in the event the participant is required to respond;
        alerting the participant that the participant has been summoned and is required to make a response;
        providing a conversation summarization to the participant, wherein an amount of the conversation summarization is based on the level of alertness of the participant at the time of the alerting; and
        deactivating the mute function.

8. The non-transitory computer-readable storage media of claim 7, further comprising using a speech recognition application in the determining of whether the participant's name is detected in the teleconference audio.

9. The non-transitory computer-readable storage media of claim 7, wherein the alerting comprises at least one of: visual, audio, and tactile stimuli.

10. The non-transitory computer-readable storage media of claim 7, further comprising audibly providing the conversation summarization to the participant.

11. The non-transitory computer-readable storage media of claim 7, further comprising providing a text version of the conversation summarization to the participant.

12. The non-transitory computer-readable storage media of claim 7, further comprising enabling the participant to prevent the deactivation of the mute function.

13. A system for teleconferencing, the system comprising:
    one or more communication devices in communication through a network;
    wherein the one or more communication devices are configured to do the following:
        activate a mute function in response to a command received from a participant of a teleconference;
        track an audio of the teleconference;
        determine whether the participant's name is detected in the audio;
        wherein in the event the participant's name is detected:
            determines if a context in which the participant was addressed requires the participant to respond;
        wherein in the event the participant is required to respond:
            alerts the participant that the participant has been summoned and is required to make a response;
            determines a level of alertness of the participant to the teleconference based upon a position of the participant relative to a telephone;
            provides a conversation summarization to the participant, wherein an amount of the conversation summarization is based on the level of alertness of the participant at the time of the alerting; and
            deactivates the mute function.

14. The system of claim 13, further comprising using a speech recognition application in the determining of whether the participant's name is detected in the teleconference audio.

15. The system of claim 13, wherein the alert comprises at least one of: visual, audio, and tactile stimuli.

16. The system of claim 13, further comprising audibly providing the conversation summarization to the participant.

17. The system of claim 13, further comprising providing a text version of the conversation summarization to the participant.

18. The system of claim 13, further comprising enabling the participant to prevent the deactivation of the mute function.

19. The system of claim 13, wherein a graphical user interface is configured to provide menu options for participant settings, text version summarizations of a teleconference conversation, and visual alerts.

20. The system of claim 13, wherein a camera and biometric sensors are configured to determine the position of the participant.

* * * * *